US006461410B1

(12) United States Patent
Abe et al.

(10) Patent No.: US 6,461,410 B1
(45) Date of Patent: Oct. 8, 2002

(54) METHOD AND APPARATUS FOR SEPARATING, REMOVING, AND RECOVERING GAS COMPONENTS

(75) Inventors: Tetsuya Abe; Sadamitsu Tanzawa, both of Ibaraki-ken; Takayuki Masuda, Tokyo, all of (JP)

(73) Assignee: Organo Corporation, Tokyo (JP)

( * ) Notice: Subject to any disclaimer, the term of this patent is extended or adjusted under 35 U.S.C. 154(b) by 7 days.

(21) Appl. No.: 09/640,833

(22) Filed: Aug. 17, 2000

(30) Foreign Application Priority Data

Aug. 20, 1999 (JP) .......................................... 11-233350

(51) Int. Cl.[7] .......................................... B01D 53/047
(52) U.S. Cl. .............................. 95/97; 95/103; 95/104; 95/116; 95/127; 96/130
(58) Field of Search ................................ 95/86, 95–97, 95/102–104, 116, 127; 96/130

(56) References Cited

U.S. PATENT DOCUMENTS

| 3,037,338 | A | * | 6/1962 | Thomas ........................ 95/104 |
| 3,728,843 | A | * | 4/1973 | Nagy et al. ..................... 95/96 |
| RE29,941 | E | * | 3/1979 | Bird .......................... 95/127 X |
| 4,402,832 | A | * | 9/1983 | Gerhold ...................... 95/86 X |
| 4,478,721 | A | * | 10/1984 | Gerhold ...................... 95/86 X |
| 4,498,991 | A | * | 2/1985 | Oroskar ...................... 95/86 X |
| 4,770,676 | A | | 9/1988 | Sircar et al. ................... 55/26 |
| 5,354,346 | A | | 10/1994 | Kumar ......................... 95/101 |
| 5,672,197 | A | * | 9/1997 | Rothchild ................... 95/103 X |

FOREIGN PATENT DOCUMENTS

| DE | 242351 A | 1/1987 |
| EP | 0257493 | 3/1988 |
| EP | 0394947 | 10/1990 |
| JP | 8-108046 | 4/1996 |
| JP | 9-239227 | 9/1997 |

OTHER PUBLICATIONS

Patent Abstracts of Japan, Publication No. 09239227 A; Date of Publication Sep. 16,1997, 1 page.
Patent Abstracts of Japan, Publication No. 08108046 A; Date of Publication Apr. 30, 1996, 1 page.
European Search Report, dated Apr. 4, 2002, 3 pages.
Search and Examination Report from the Intellectual Property Office of Singapore dated Apr. 18, 2002 (9 pages).

* cited by examiner

*Primary Examiner*—Robert H. Spitzer
(74) *Attorney, Agent, or Firm*—Rosenthal & Osha L.L.P.

(57) ABSTRACT

A raw gas containing a gas component A with low affinity with an adsorbent and a gas component C with high affinity with the adsorbent are sequentially supplied to at least three adsorption columns, while a desorption gas containing a gas component D which differs from the gas components A and C is supplied to each of the adsorption columns other than the one to which the raw gas is being supplied. When the raw gas is supplied to the adsorption columns, the gas component A having lower affinity with the adsorbent exits the adsorption columns earlier than the gas component C having higher affinity. The gas components A and C can thus be separated from each other. When a gas including an enriched gas component A is discharged from the outlet of each adsorption column, the full amount is extracted out of the system. When a gas including an enriched gas component C is discharged from the outlet of each adsorption column, the full amount is extracted out of the system. When the gas mixture containing the gas components A and C is discharged from the exit of each adsorption column, all the discharged gas is fed back to the inlet of the adsorption column to which the raw gas is being supplied. It is possible to efficiently and sequentially separate the gas components A and C with this simple structure.

11 Claims, 12 Drawing Sheets

| STEP NO. | D | c | f | a | b | Z | VP-14B | VP-14A | VP-14C | TIMER |
|---|---|---|---|---|---|---|---|---|---|---|
| 1-1 | 1-4D | 1-2c | 1f | 4a | 3b | | ○ | ○ | ○ | 30 sec. |
| 1-2 | 1-4D | 1-2c | 1f | | 3-4b | | ○ | | ○ | 30 sec. |
| 1-3 | 1-4D | 1-3c | 1f | | 4b | | ○ | | ○ | 30 sec. |
| 1-4 | 1-4D | 2-3c | 1f | 1a | 4b | | ○ | ○ | ○ | 90 sec. |
| 2-1 | 1-4D | 2-3c | 2f | 1a | 4b | | ○ | ○ | ○ | 30 sec. |
| 2-2 | 1-4D | 2-3c | 2f | | 4-1b | | ○ | | ○ | 30 sec. |
| 2-3 | 1-4D | 2-4c | 2f | | 1b | | ○ | | ○ | 30 sec. |
| 2-4 | 1-4D | 3-4c | 2f | 2a | 1b | | ○ | ○ | ○ | 90 sec. |
| 3-1 | 1-4D | 3-4c | 3f | 2a | 1b | | ○ | ○ | ○ | 30 sec. |
| 3-2 | 1-4D | 3-4c | 3f | | 1-2b | | ○ | | ○ | 30 sec. |
| 3-3 | 1-4D | 3-1c | 3f | | 2b | | ○ | | ○ | 30 sec. |
| 3-4 | 1-4D | 4-1c | 3f | 3a | 2b | | ○ | ○ | ○ | 90 sec. |
| 4-1 | 1-4D | 4-1c | 4f | 3a | 2b | | ○ | ○ | ○ | 30 sec. |
| 4-2 | 1-4D | 4-1c | 4f | | 2-3b | | ○ | | ○ | 30 sec. |
| 4-3 | 1-4D | 4-2c | 4f | | 3b | | ○ | | ○ | 30 sec. |
| 4-4 | 1-4D | 1-2c | 4f | 4a | 1b | | ○ | ○ | ○ | 90 sec. |

(NOTE)
"n-Mx" means that all the valves nX to mX are opened. For example, "4-2c" means that the valves 4c, 1c and 2c are all opened.

Fig. 2

| STEP NO. | OPENING AND CLOSING OF VALVES (OPENED VALVES ARE INDICATED) | | | | | | PUMPS BEING OPERATED | | | SWITCH |
|---|---|---|---|---|---|---|---|---|---|---|
| | D | c | f | a | b | Z | VP-14B | VP-14A | VP-14C | TIMER |
| 1-1 | 1-3D | 1c | 1f | 3a | 2b | | ○ | | ○ | 30 sec. |
| 1-2 | 1-3D | 1c | 1f | | 2-3b | | ○ | | ○ | 30 sec. |
| 1-3 | 1-3D | 1-2c | 1f | | 3b | | ○ | | ○ | 120 sec. |
| 2-1 | 1-3D | 2c | 2f | 1a | 3b | | ○ | ○ | | 30 sec. |
| 2-2 | 1-3D | 2c | 2f | | 3-1b | | ○ | | | 30 sec. |
| 2-3 | 1-3D | 2-3c | 2f | | 1b | | ○ | | | 120 sec. |
| 3-1 | 1-3D | 3c | 3f | 2a | 1b | | ○ | ○ | | 30 sec. |
| 3-2 | 1-3D | 3c | 3f | | 1-2b | | ○ | | | 30 sec. |
| 3-3 | 1-3D | 3-1c | 3f | | 2b | | ○ | | ○ | 120 sec. |

(NOTE)
"n-Mx" means that all the valves nX to mX are opened. For example, "3-1c" means that the valves 3c and 1c are all opened.

Fig. 9

METHOD AND APPARATUS FOR SEPARATING, REMOVING, AND RECOVERING GAS COMPONENTS

BACKGROUND OF THE INVENTION

1. Field of the Invention

The present invention relates to a method and an apparatus for separating a desired gas component from a gas mixture containing a plurality of gas components.

2. Description of Related Art

Discharge into the atmosphere of hazardous gases including radioactive gases such as tritium (T), highly toxic gases such as dioxin, volatile gases such as hydrogen (H), or gases which accelerate global warming such as carbon dioxide, methane, or PFC (perfluoro compound) gases must be prevented. Therefore, gaseous mixtures containing these gases are processed in order to separate hazardous and benign gases.

Conventional techniques for gas separation will be described.

Compound Cryopump Method

Two plates which are cooled at a liquid helium temperature (−269° C.) under super high vacuum of $10^{-7}$~$10^{-8}$ Torr are prepared, and an adsorbent is applied to a surface of one of the two plates. When a gas mixture containing hydrogen isotopes including tritium, and helium is first brought into contact with the plate having no adsorbent applied, the hydrogen isotopes, which has a higher boiling point than helium, are condensed on this plate. Helium passes through this plate to reach the other plate bearing the adsorbent and is adsorbed on the adsorbent.

Because this method is followed under high vacuum, the volume of gases to be processed is enormous compared to a case where a gas is processed at around 1 atmosphere. This requires a significant increase in the surface area of a cooling plate on which a gas(es) is adsorbed, to thereby disadvantageously increase the size of a whole adsorption apparatus.

Pressure Swing Adsorption Method (hereinafter referred to as "PSA")

The PSA method is widely used for separating various mixtures of gases. According to this method, for purification of hydrogen, for example, a column is first packed with a molecular sieve which functions as an adsorbent. A raw gas containing a mixture of hydrogen and gases having a molecular structure larger than that of hydrogen, such as carbon dioxide and methane gas, is fed to an adsorption column while the raw gas is pressurized to approximately 10~20 atmospheres, so as to have hydrogen adsorbed on the column while the remaining gases are discharged out of the column. Thereafter, the column is depressurized to the atmospheric pressure or a lower pressure, thereby desorbing hydrogen to obtain highly purified hydrogen. This method utilizes a change in the amount of a component to be adsorbed on the adsorbent according to the partial pressure of the component.

With this method, however, the adsorbing process should be performed under a high pressure in order to maximize the amount of a particular gas component that is adsorbed. For this reason, considerable effort must be exerted to ensure that any gas does not leak from the column and therefore this method is not suitable for treating any gas which becomes hazardous under high pressure.

Method Using Gas Separation Membrane

Hydrogen isotopes and helium have extremely high permeability to high polymer membranes and the like and can be separated from oxygen, nitrogen, hydrocarbons or the like according to a permeability difference therebetween. However, this method cannot separate gas components having substantially the same permeability, such as hydrogen isotopes and helium.

SUMMARY OF THE INVENTION

According to the present invention, at least three adsorption columns packed with an adsorbent are used. A raw gas containing a gas component A with low affinity with said adsorbent and a gas component C with high affinity with the adsorbent is sequentially fed to the adsorption columns in turn, while an desorption gas containing a gas component D which differs from the gas components A and C is fed to each of the adsorption columns other than the one to which the raw gas is being supplied.

When the raw gas is supplied to one of the adsorption columns, the gas component A in the raw gas having lower affinity with the adsorbent exits the adsorption column earlier than the gas component C in the raw gas having higher affinity. In this manner, the gas components A and C can be separated from each other.

According to another aspect of the present invention, when a gas enriched with the gas component A is discharged from the outlet of each adsorption column, all of the gas is extracted from the system. When a gas enriched with the gas component C is discharged from the outlet of each adsorption column, the full amount is extracted from the system. When the gas mixture containing the gas components A and C is discharged from the outlet of each adsorption column, all of the discharged gas mixture is fed back to the inlet of the adsorption column to which the raw gas is being supplied.

It is thus possible to efficiently and sequentially obtain the gas components A and C with a simple structure and efficient processing.

As described above, while the raw gas is supplied to the adsorption column, the gas components A and C can be collected separately from the adsorption column. This is because the component A having lower affinity with the adsorbent moves fast through the adsorption column while the component C having higher affinity with the adsorbent moves slow through the adsorption column, which causes a difference in time when the components A and C are released from the adsorption column.

The method according to the present invention can be applied under various additional conditions depending on specific gases to be separated. When separating a gas whose leak from the system is prohibited, a condition that such separation is performed with a pressure within the system being an atmosphere or less can be added.

In this case, gas discharge for each fraction can be achieved by a vacuum pump.

Further, an operation method which requires no pumps in the circulation line can be adopted by controlling the flow amount and pressure of the gas when supplying the gas mixture extracted from one adsorption column to another adsorption column.

Also, as a feature of the present invention, a concentration operation process can be performed. According to the concentration operation process, the component A or C is not extracted, but is accumulated within the system for some time. After the gas composition within the system is made significantly different from that of the raw gas, the gas is extracted out of the system.

BRIEF DESCRIPTION OF THE DRAWINGS

These and other objects of the invention will be explained, in the description below, in connection with the accompanying drawings, in which:

FIG. 2 is a timing chart explaining operation timing of the example shown in FIG. 1;

FIG. 9 is a timing chart for explaining an operation timing of the example shown in FIG. 8.

EXAMPLES

The present invention will be described in further detail according to the following examples. It should be understood that the present invention is not limited to the following examples and modifications and variations may be made without departing from the scope of the present invention.

Figure 1:
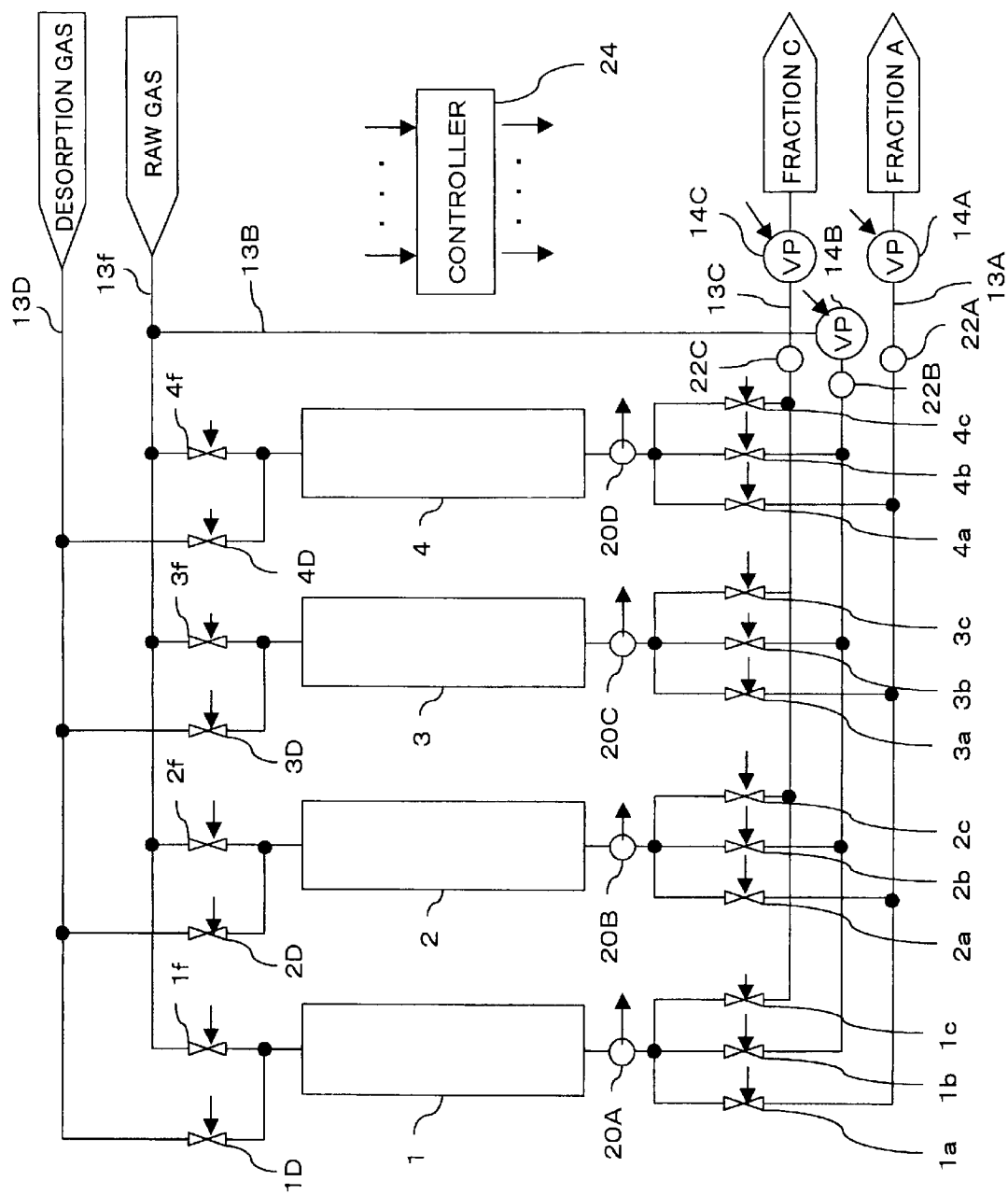
FIG. 1 is a diagram showing a whole structure of an apparatus according to one example of the present invention.

FIG. 1 schematically depicts one example structure of a simulated moving bed type separation apparatus for implementing the method according to the present invention.

Referring to FIG. 1, adsorption columns 1~4 are packed with the same adsorbent and include respective outlets connected to a pipe 13B via respective extraction valves 1b~4b for a gas mixture. The pipe 13B is also coupled to a raw gas pipe 13f. Although the pipe 13B is provided with a vacuum pump 14B, this vacuum pump 14B can be eliminated by contriving the operation conditions. The raw gas pipe 13f is coupled to the inlets of the adsorption columns 1~4 via raw gas inlet valves 1f~4f, respectively.

A desorption gas (carrier gas) pipe 13D is also connected to the respective adsorption columns 1~4 via respective supply valves 1D~4D. The adsorption columns 1~4 at their outlet sides are connected to an extraction pipe 13A for the component gas A via respective extraction valves 1a~4a for fraction A and also to an extraction pipe 13C for the component gas C via respective extraction valves 1c~4c for fraction C. The extraction pipes 13A and 13C are provided with vacuum pumps 14A and 14C, respectively, for gas extraction.

Sensors 20A, 20B, 20C and 20D are disposed at the corresponding outlets of respective adsorption columns 1~4 for detecting the concentration of the A and C components in the discharged gas. Appropriate sensors are selected for these sensors 20A~20D according to the gases to be detected.

Further, flow meters 22A, 22B, 22C are disposed on the pipes 13A, 13B, 13C before the vacuum pumps 14A, 14B, 14C, respectively.

A signal indicative of the concentration detected by the sensor 20A, 20B, 20C or 20D is transmitted to a controller 24, which controls opening and closing of the valves 1f~4f, 1D~4D, 1a~1c, 2a~2c, 3a~3c, and 4a~4c so as to control the flow path of the gas and also controls the vacuum pumps 14A~14C so as to control the flow rate. When the amount of the A or C component contained in the raw gas does not change significantly, the sensors 20A, 20B, 20C, 20D may be eliminated and the operation may be switched for every predetermined time period set by a timer.

The operation of the apparatus will be described on the basis of the time schedule shown in FIG. 2. In this example, all of the valves 1D~4D are opened so that the desorprion gas is continuously fed to all the adsorption columns 1~4. During the steps 1-1~1-4, the valve 1f is opened such that the raw gas is supplied to the adsorption column 1, during the steps 2-1~2-4, the valve 2f is opened such that the raw gas is supplied to the adsorption column 2, during the steps 3-1~3-4, the valve 3f is opened such that the raw gas is supplied to the adsorption column 3, and during the steps 4-1~4-4, the valve 4f is opened such that the raw gas is supplied to the adsorption column 4. After the steps 1-1~1-4 are completed, substantially the same steps will be subsequently repeated while shifting the supply port to the next column. Therefore, only the steps 1-1~1-4 will be described here. Referring to FIGS. 3~6, the lines through which a gas is flowing, the valves that are opened, and the vacuum pumps that are being operated are indicated by bold lines. The desorption gas, which is always flowing, will not be described.

(Step 1-1: 30 seconds)

Figure 3:
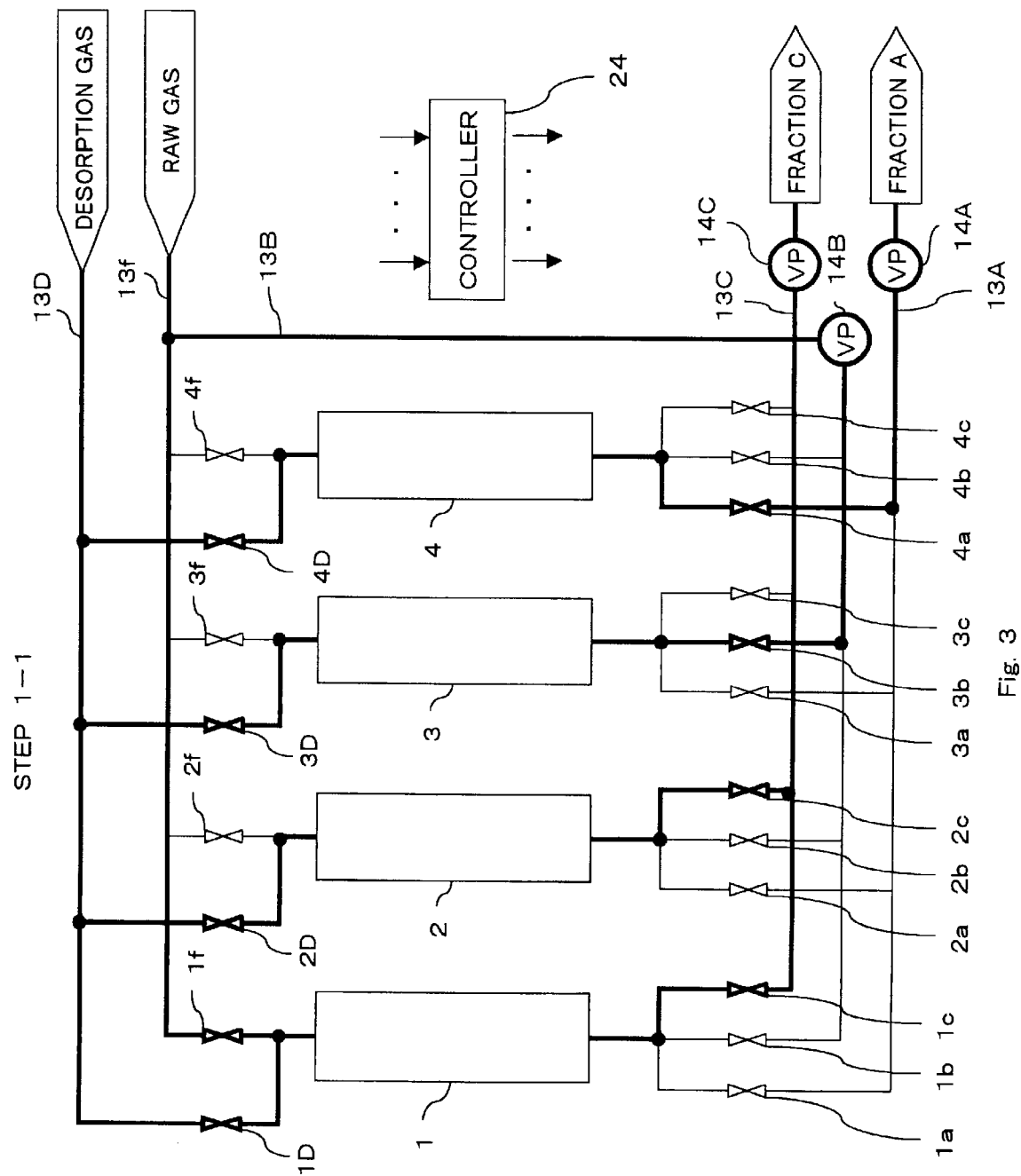
FIGS. 3, 4, 5 and 6 are diagrams showing operation conditions in process steps 1-1~1-4, respectively, of the example shown in FIG. 1.

As shown in FIG. 3, all of the vacuum pumps 14A, 14B, 14C are operational. The valve 1f is opened so that the raw gas is supplied to the adsorption column 1. The valves 1c and 2c are opened so that the gas component C is extracted from the adsorption columns 1 and 2. Further, the valve 4a is opened so that the gas component A is extracted from the adsorption column 4. Further, the valve 3b is opened so that the gas mixture discharged from the adsorption column 3 is fed back to the adsorption column 1.

(Step 1-2: 30 seconds)

Figure 4:
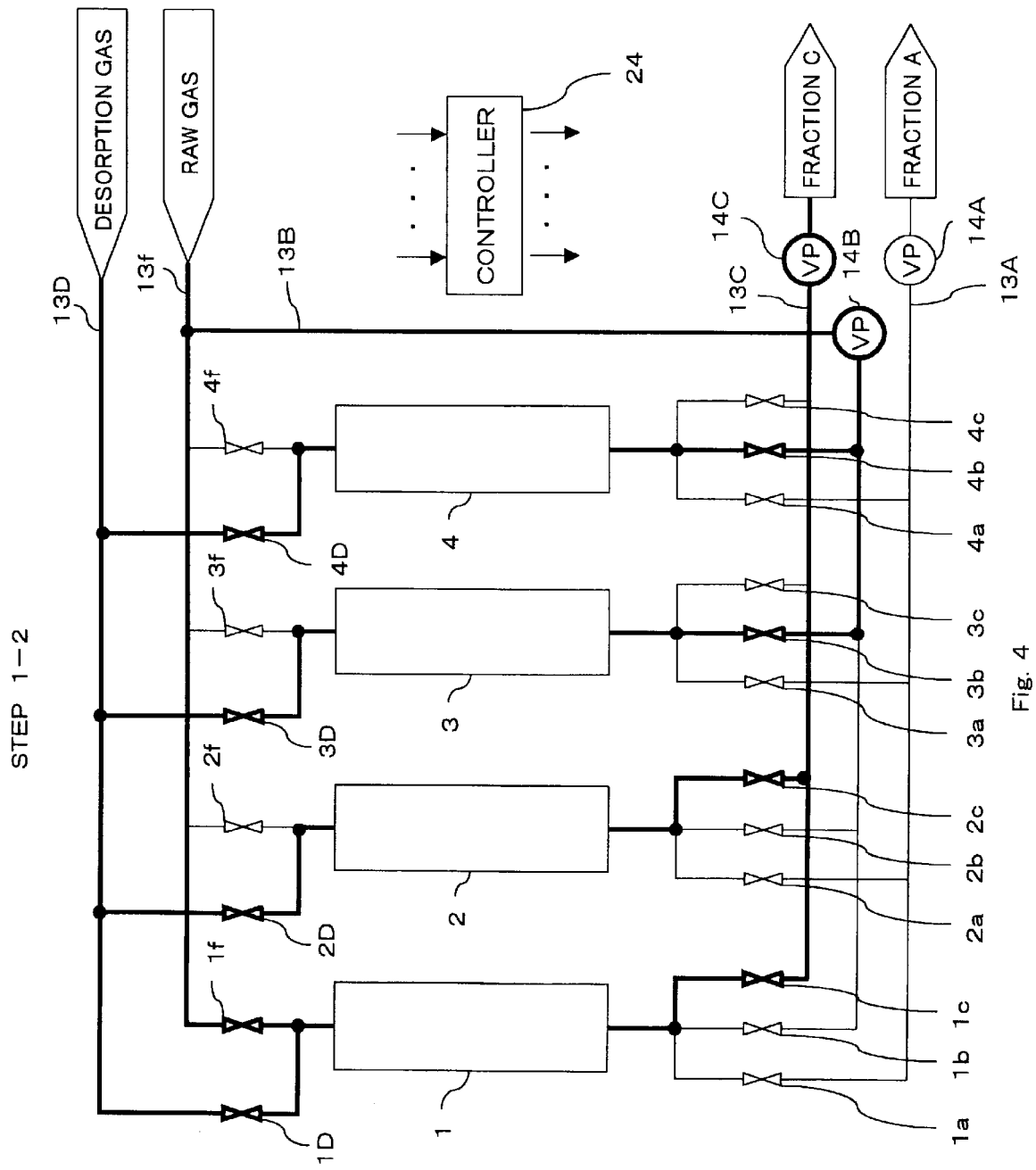

As shown in FIG. 4, the vacuum pumps 14B and 14C are being operated. The valve 1f is opened and the raw gas is supplied to the adsorption column 1. The valves 1c and 2c are opened so that the gas component C is extracted from the adsorption columns 1 and 2. Since the valve 4a is closed, extraction of the gas component A is interrupted. The valves 3b and 4b are opened so that the gas mixture discharged from the adsorption columns 3 and 4 is fed back to the adsorption column 1.

(Step 1-3: 30 seconds)

Figure 5:
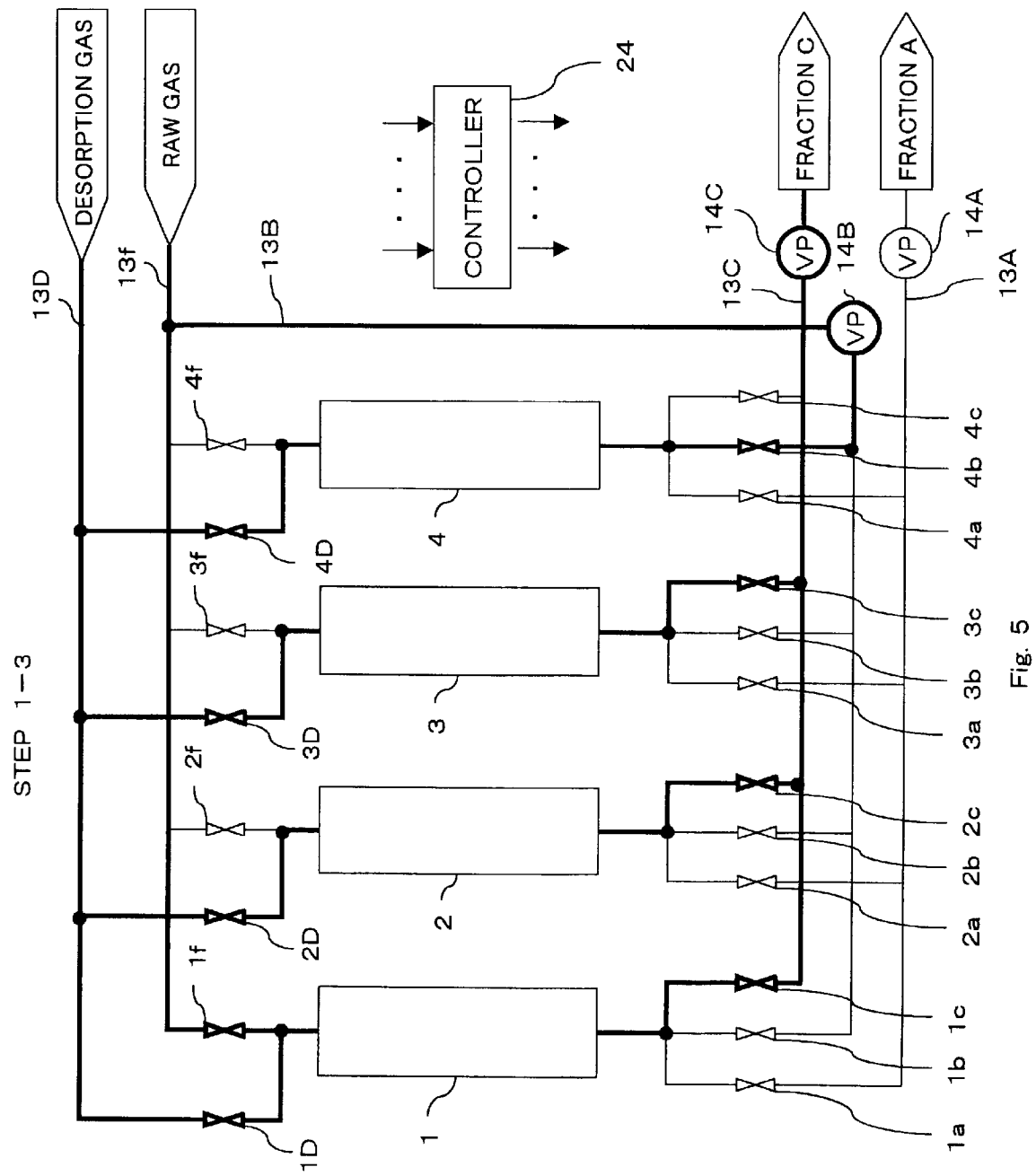

As shown in FIG. 5, the vacuum pumps 14B and 14C are being operated. The valve 1f is opened and the raw gas is supplied to the adsorption column 1. The valves 1c, 2c and 3c are opened so that the gas component C is extracted from the adsorption columns 1, 2 and 3. Since the valve 4b is opened, the gas mixture discharged from the adsorption column 4 is fed back to the adsorption column 1.

(Step 1-4: 90 seconds)

Figure 6:
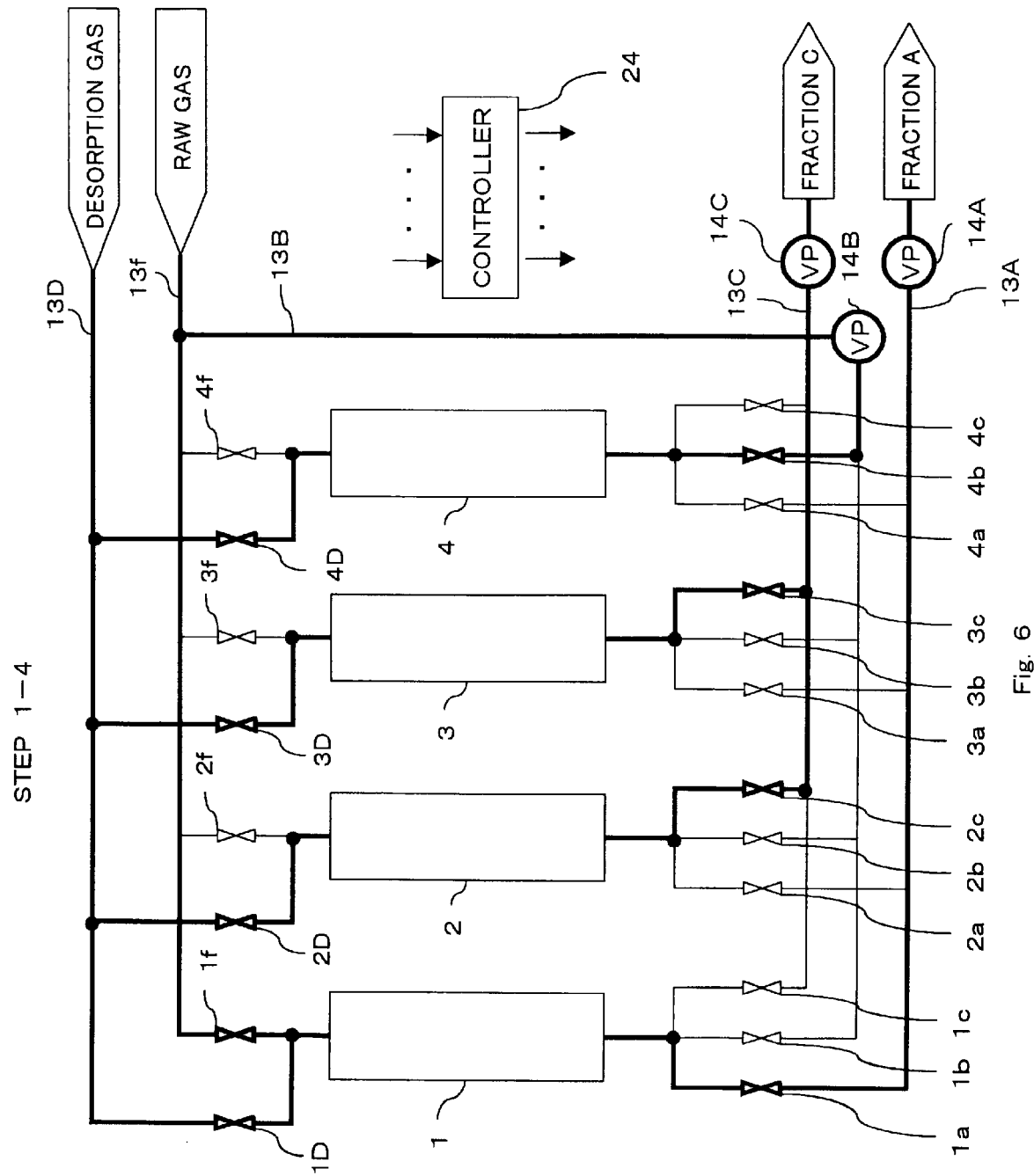

As shown in FIG. 6, all of the vacuum pumps 14A, 14B, 14C are being operated. The valve 1f is opened so that the raw gas is supplied to the adsorption column 1. The valves 2c and 3c are opened so that the gas component C is extracted from the adsorption columns 2 and 3. Further, the valve 1a is opened so that the gas component A is extracted from the adsorption column 1. Since the valve 4b is opened, the gas mixture discharged from the adsorption column 4 is fed back to the adsorption column 1.

When the specific adsorption column 1 is observed, on the other hand, while the raw gas is being introduced through the inlet in the step 1-1, the gas component C adsorbed in the adsorption column 1 due to the previously supplied raw gas as well as the adsorption gas D are discharged from the outlet. This state continues through the steps 1-1~1-3. The gas component C thus discharged is collected as fraction C by the vacuum pump 14C. The amount of the gas component C within the adsorption column 1 decreases with time and at the end of the step 1-3 only the desorption gas D is discharged. At the step 1-4, the gas component A reaches the outlet and is then discharged along with the adsorption gas D from the outlet until the step 2-1. The discharged gas component A is collected as fraction A by the vacuum pump 14A. Since the raw gas is no longer supplied to the adsorption column 1 at the step 2-1 and after that while only the desorption gas D is supplied from the inlet of the adsorption column 1, the gas component adsorbed within the adsorption column 1 and the desorption gas D is discharged from the outlet until the step 4-4. Then, the gas component C also reaches the outlet, and therefore the gas mixture containing the gas components A and C and the desorption gas D is discharged during the steps 2-2~3-2. The gas mixture thus discharged is supplied to the adsorption column to which the raw material is being supplied. When the gas component A is completely discharged, the gas component C and the desorption gas D is discharged during the steps 3-3~1-3.

In this manner, the gas component A having low affinity with the adsorbent is first discharged, the gas mixture containing both gas components A and C is then discharged, and the gas component C having high affinity is discharged thereafter.

In this example, extraction of gas from the adsorption column to which the raw gas is being supplied is always performed by the vacuum pump 14C or 14A. Therefore, by controlling the vacuum pump 14C or 14A so as to adjust the ratio between the raw gas and the gas mixture used for circulation in addition to appropriately adjusting the extraction rate for that pump 14C or 14A, the vacuum pump 14B may be eliminated. In this case, it is preferable to provide a flow rate adjusting valve for adjusting the flow rate of the raw gas and/or the circulation gas.

As described above, along with the operation for each of the four adsorption columns, a moving operation is also performed for sequentially moving the supply ports for the raw gas and the desorption gas as well as the extraction ports for the A and C components and the gas mixture to the following adsorption columns one by one in accordance with the movement of the accumulating zones for the A and C components.

The desorption gas may be supplied as required, such as when dilution is necessary, and need not be supplied when not required. Further, the return of the gas mixture extracted from each of the adsorption columns may be performed while the supply of the raw gas is being interrupted.

In this example, particularly, the full amount discharged from one adsorption column is extracted as the gas component A or C, or is circulated as a gas mixture. It is thus possible to perform efficient operation by a simplified system.

Figure 7:
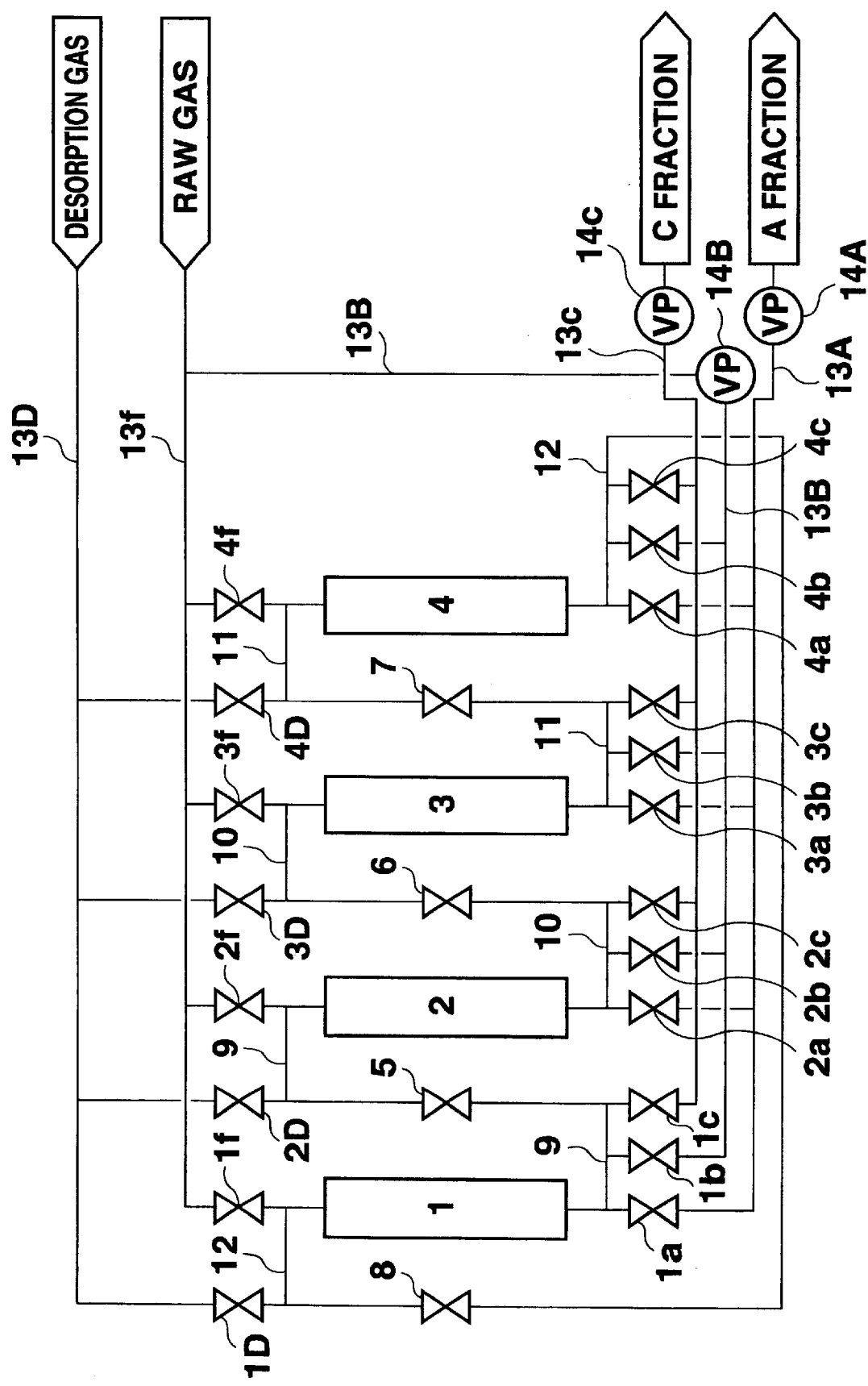
FIG. 7 is a diagram showing a conventional structure.

FIG. 7 depicts, for the purpose of comparison with the present invention, one example structure of a simulated moving bed type separation apparatus for implementing the invention disclosed in the Japanese Patent Laid-Open Publication No. Hei 9-239227.

Referring to FIG. 7, the adsorption columns 1~4 packed with the same adsorbent are connected with one another via respective pipes 9~11 having respective cutoff valves 5~7 so as to permit flowing and cutoff of fluid. The back end of the adsorption column 4 disposed at the last stage is coupled via a pipe 12 having a cutoff valve 8 to the front end of the adsorption column 1 disposed at the first stage. The cutoff valves 5~8 provided at the connecting pipes between adjacent adsorption columns are controlled to be opened or closed by a controller (not shown).

To the pipes 12 and 9~11 coupled to the inlet side of the adsorption columns 1~4, respectively, a supply pipe 13f for a raw gas containing a gas component A having low affinity with the adsorbent and a gas component C having high affinity with the adsorbent is connected via corresponding supply valves 1f~4f and a supply pipe 13D for a desorption gas is connected via corresponding supply valves 1D~4D. To the pipes 9~12 coupled to the outlet side of the adsorption columns 1~4, an A component extraction pipe 13A is connected via corresponding extraction valves 1a~4a for A fraction, a C component extraction pipe 13C is connected via corresponding extraction valves 1c~4c for C fraction, and a circulation pipe 13B for a gas mixture containing the A component and the C component is connected via corresponding extraction valves 1b~4b. The pipes 13A~13C are provided with vacuum pumps 14A~14C, respectively, for gas extraction.

As is clear from comparison with the apparatus of FIG. 7, the apparatus shown in FIG. 1 has a greatly simplified structure which eliminates the need for the pipes 9~12 for connecting the adsorption columns, and for the cutoff valves 5~8 provided with the pipes.

In particular, the system disclosed in Japanese Patent Laid-Open Publication No. Hei 9-239227 basically couples a plurality of adsorption columns endlessly so that $H_2$ gas is extracted by diverging a part of the discharged gas. In such a system, the cutoff valves are required for extracting a full amount of He gas.

Thus, the system disclosed in the above-mentioned publication, which may be physically similar to the apparatus of the present invention, differs from the apparatus of the present invention in the operation and control methods.

Figure 8:
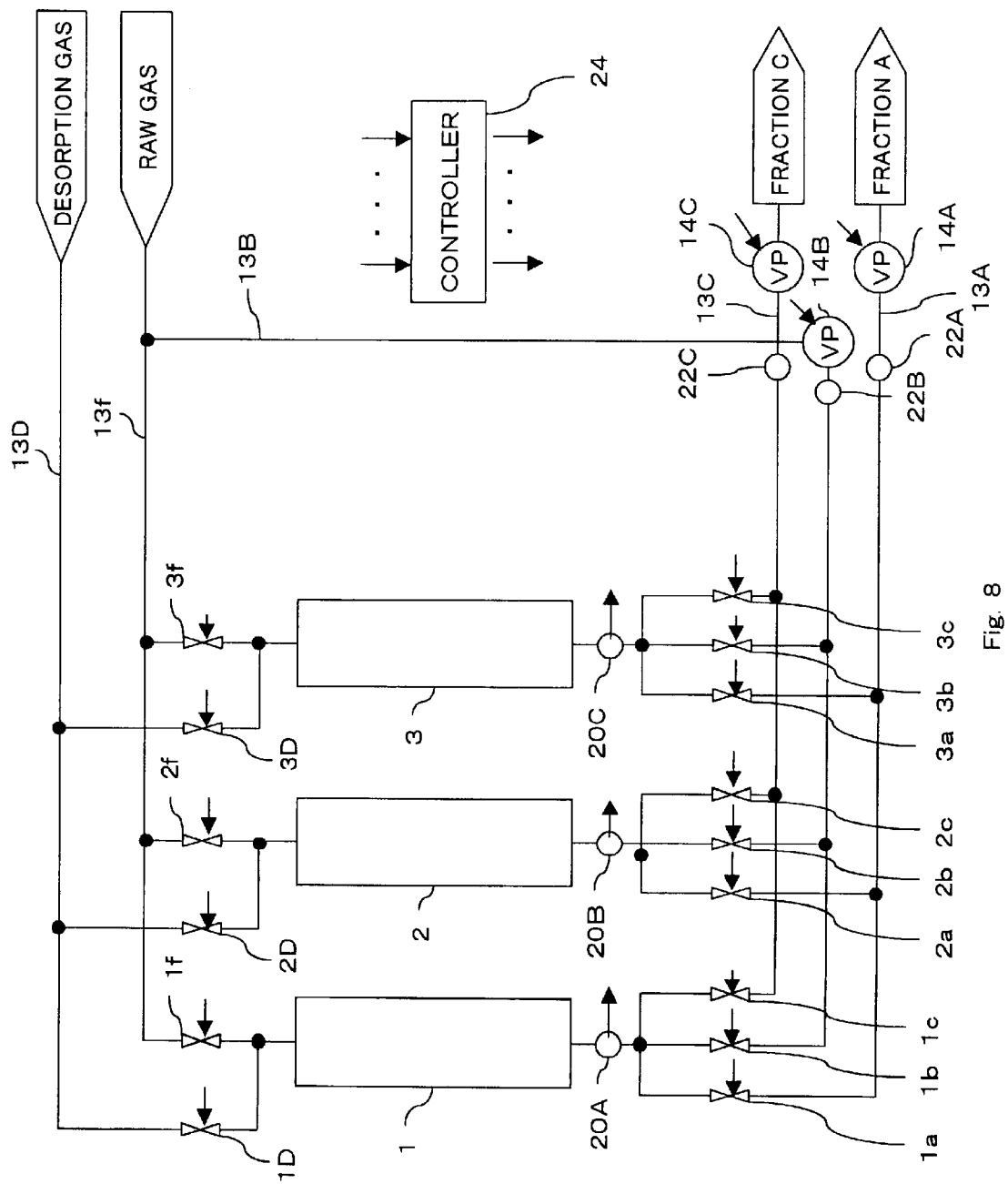
FIG. 8 is a diagram showing the overall structure of an apparatus according to another example of the present invention.

FIG. 1 depicts one example structure of a separation apparatus provided for implementing the present invention and therefore it is possible to change the number of the adsorption columns and the supply and extraction valves accordingly, as shown in FIG. 8, depending on purity or recovery ratio for intended separation.

The operation of the apparatus of the present invention shown in FIG. 8 will be described when performing the steps 1-1~1-3 of the time schedule shown in FIG. 9, for example.
(Step 1-1: 30 seconds)

Figure 10:
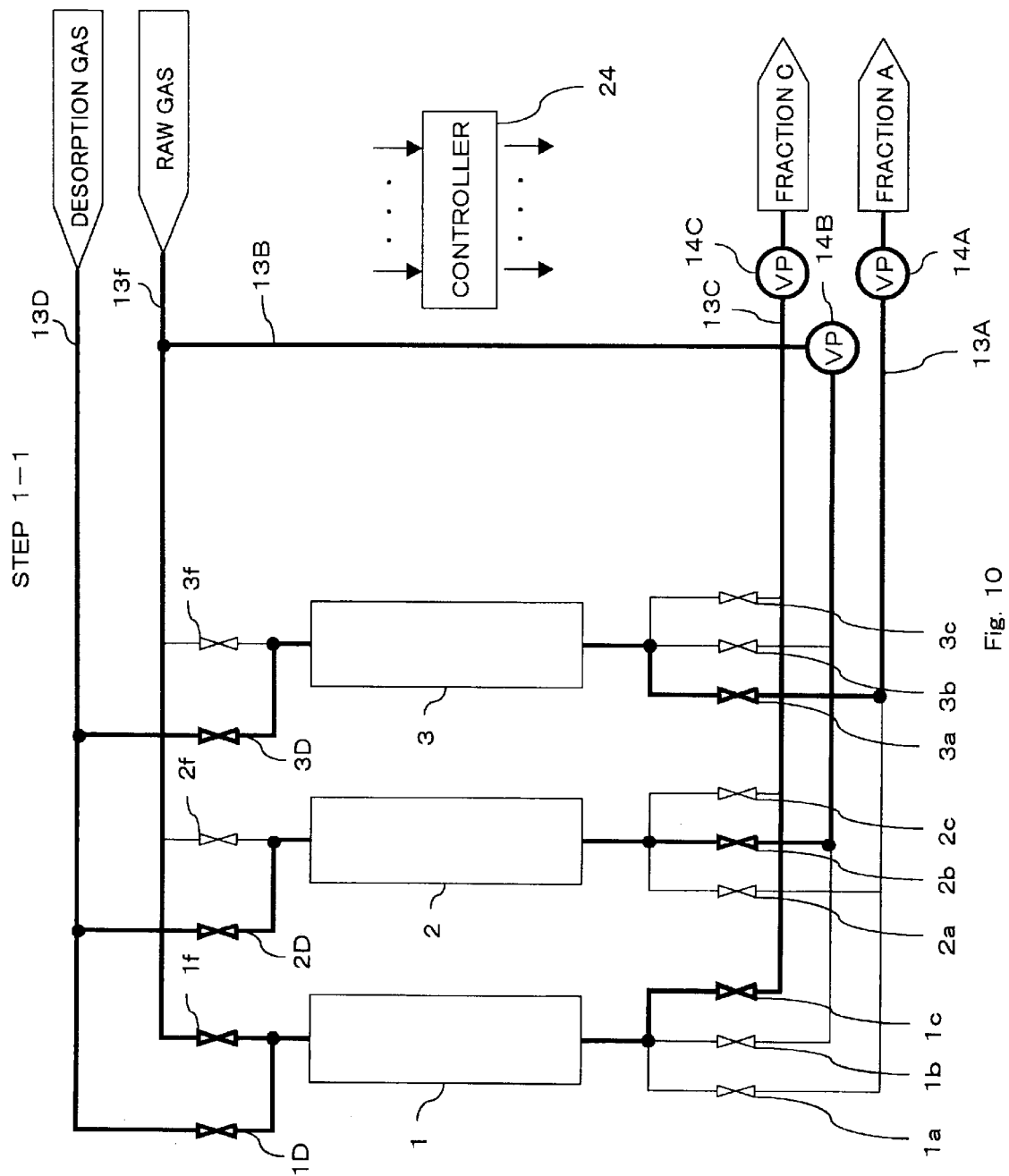
FIGS. 10, 11, and 12 are diagrams showing operation conditions in process steps 1-1~1-3, respectively, of the example shown in FIG. 1.

As shown in FIG. 10, all of the vacuum pumps 14A, 14B, 14C are in operation. The valve 1f is opened so that the raw gas is supplied to the adsorption column 1. The valves 1c is opened so that the gas component C is extracted from the adsorption column 1. Further, the valve 3a is opened so that the gas component A is extracted from the adsorption column 3. Further, the valve 2b is opened so that the gas mixture discharged from the adsorption column 2 is fed back to the adsorption column 1.
(Step 1-2: 30 seconds)

Figure 11:
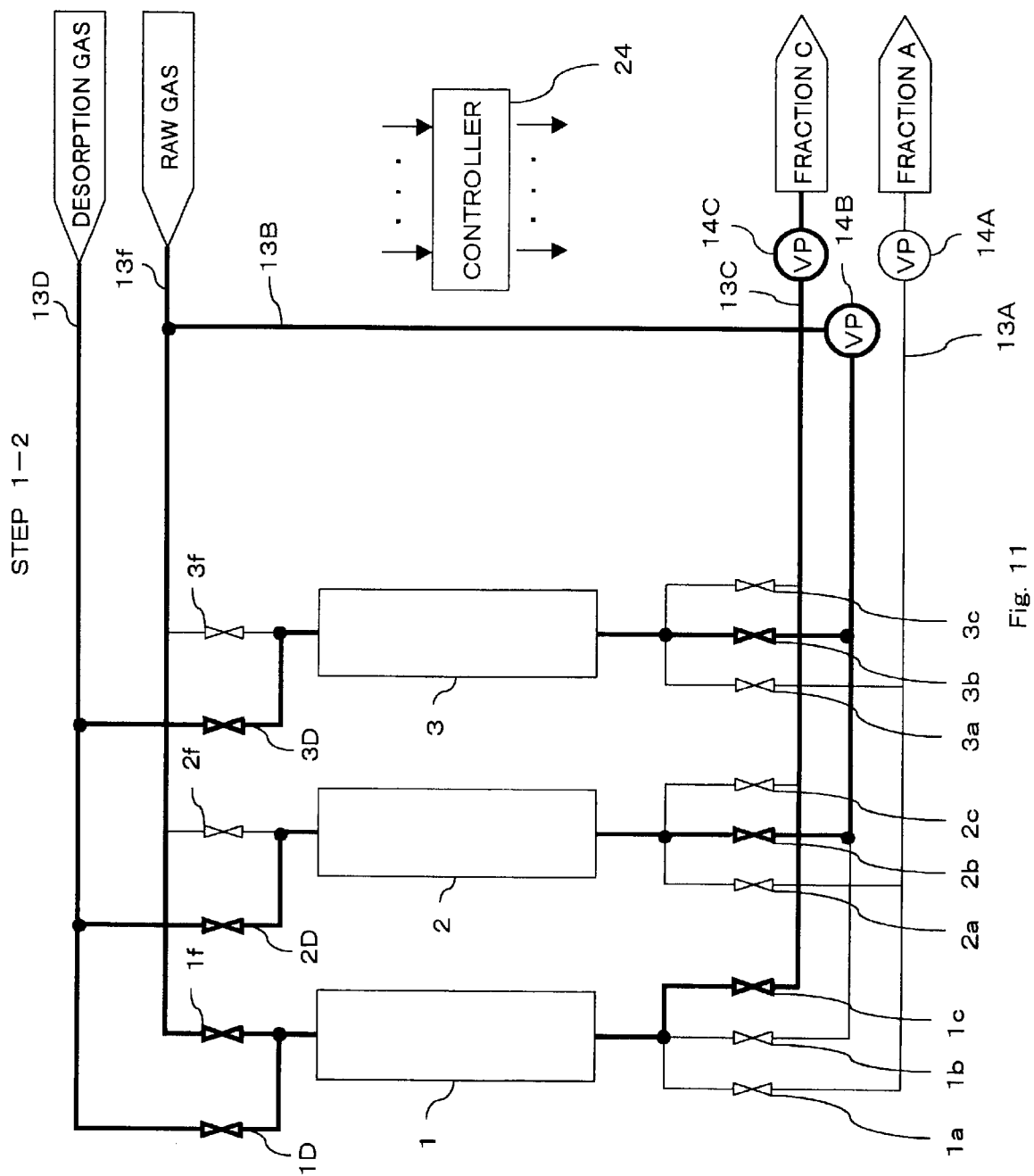

As shown in FIG. 11, the vacuum pumps 14B and 14C are being operated. The valve 1f is opened and the raw gas is supplied to the adsorption column 1. The valve 1c is opened so that the gas component C is extracted from the adsorption column 1. Since the valve 3a is closed, extraction of the gas component A is interrupted. The valves 2b and 3b are opened so that the gas mixture discharged from the adsorption columns 2 and 3 is fed back to the adsorption column 1.
(Step 1-3: 120 seconds)

Figure 12:
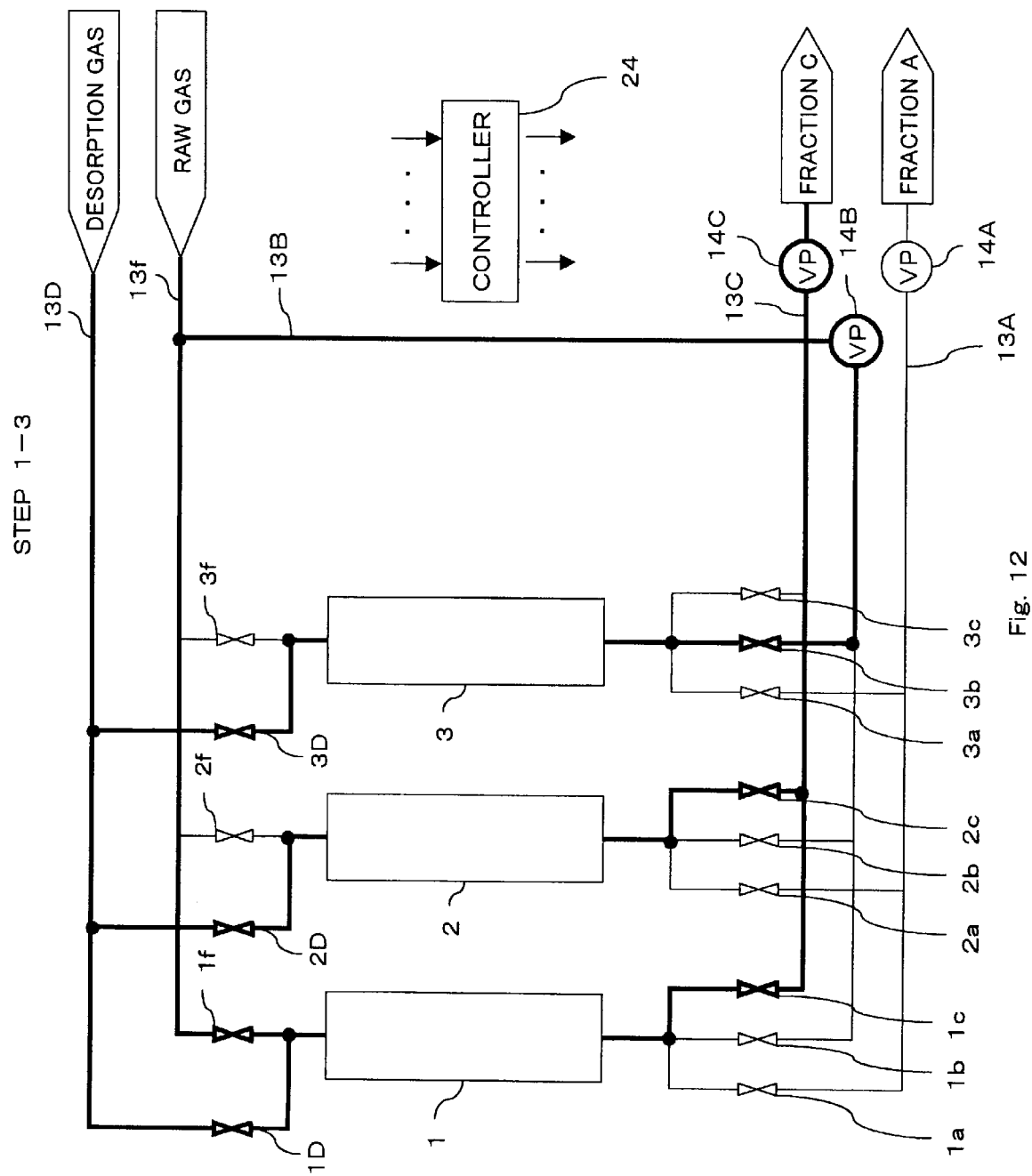

As shown in FIG. 12, the vacuum pumps 14B and 14C are being operated. The valve 1f is opened and the raw gas is supplied to the adsorption column 1. The valves 1c and 2c are opened so that the gas component C is extracted from the adsorption columns 1 and 2. Since the valve 3b is opened, the gas mixture discharged from the adsorption column 3 is fed back to the adsorption column 1.

At the step 1-3, almost no gas component C remains within the adsorption column 1, and the gas component A separated from the raw gas is discharged from the adsorption column 1 during the subsequent step 2-1. Accordingly, when the process proceeds to the step 2-1, the supply port and extraction port are shifted by one, such that operation switching in accordance with the status of the adsorption zones can be achieved.

In this example, extraction of gas from the adsorption column to which the raw gas is being supplied is always performed by the vacuum pump 14C. Therefore, by controlling the vacuum pump 14C so as to adjust the ratio between the raw gas and the gas mixture used for circulation in addition to appropriately adjusting the extraction rate for that pump, the vacuum pump 14B may be eliminated. In this case, it is preferable to provide a flow rate adjusting valve for adjusting the flow rate of the raw gas and/or the circulation gas.

In this manner, along with the operations for each of the three adsorption columns, a moving operation is also performed for sequentially moving the supply port for the raw gas and the extraction port for the A and C components and the gas mixture to the following adsorption columns one by one in accordance with the movement of the accumulation zones of the A and C components.

FIRST EXAMPLE

Separation of the raw gas indicated in Table 1 was performed using the apparatus shown in FIG. 1 through repetition of the steps defined in the time schedule of FIG. 2, and separated gases indicated in Table 2 were obtained.

In the apparatus shown in FIG. 1, molecular sieve 5A was used as an adsorbent and argon (Ar) was used as desorption gas.

In this example, helium (He) was the A component having lower affinity with the adsorbent and hydrogen ($H_2$) was the C component having higher affinity with the adsorbent.

Each of the four adsorption columns had an inner diameter of 20 mm and a packed bed length of 3000 mm, and the adsorption columns were packed with a total of 3768 ml of adsorbent, in which separation process was repeatedly performed.

As a result, the method of the present invention achieved separation of hydrogen and helium in an extremely easier manner and with higher performance compared to the conventional method.

TABLE 1

| Composition of Raw Gas (Volume %) | |
|---|---|
| $H_2$ | He |
| 50 | 50 |

TABLE 2

| | Composition (Volume %) | |
|---|---|---|
| | $H_2$ | He |
| Helium Extraction | 0.0 | 100.0 |
| Hydrogen Extraction | 100.0 | 0.0 |

(NOTE)
The desorption gas is not contained in the composition (volume %)

SECOND EXAMPLE

Separation of the raw gas indicated in Table 3 was performed using the apparatus shown in FIG. 8 through repetition of the steps defined in the time schedule of FIG. 9, and separated gases indicated in Table 4 were obtained.

In the apparatus shown in FIG. 8, molecular sieve 5A was used as an adsorbent and argon (Ar) was used as a desorption gas.

In this example, helium (He) is the A component having lower affinity with the adsorbent and deuterium ($D_2$) is the C component having higher affinity to the adsorbent.

Each of the three adsorption columns had an inner diameter of 20 mm and a packed bed length of 3000 mm, and the adsorption columns were packed with a total of 2826 ml of adsorbent, in which separation process was repeatedly performed.

As a result, the method of the present invention achieved separation of deuterium and helium in an extremely easier manner and with higher performance compared to the conventional method.

TABLE 3

| Composition of Raw Gas (Volume %) | |
|---|---|
| $D_2$ | He |
| 90 | 10 |

TABLE 4

| | Composition (Volume %) | |
|---|---|---|
| | $D_2$ | He |
| Helium Extraction | 0.0 | 100.0 |
| Deuterium Extraction | 100.0 | 0.0 |

(NOTE)
The desorption gas is not contained in the composition (Volume %)

According to the present invention, since desired separation of gases can be continuously executed by a simulated moving bed type separation apparatus which has high efficiency for adsorbent utilization, a small-size separation apparatus can be used so that the installation cost for the apparatus can be reduced even when the apparatus is used for large quantity processing. The present invention permits extremely high separation and thus can be used for complete separation without increasing a pressure during the adsorption process. Accordingly, even when treating an extremely hazardous gas(es), the present invention can provide a separation method with high safety because separation can be performed while maintaining the pressure within the system under the atmosphere. The present invention is further advantageous in that the amount of desorption gas can be reduced due to the feature of the simulated moving bed type apparatus. This can significantly decrease the degree of dilution for the component to be separated by the desorption gas.

While the preferred examples of the present invention have been described using specific terms, such description is for illustrative purposes only, and it is to be understood that changes and variations may be made without departing from the spirit or scope of the appended claims.

What is claimed is:
1. A method of separating raw gas into a plurality of fractions using at least three adsorption columns packed with an adsorbent, comprising the steps of:
sequentially supplying raw gas containing a gas component A having low affinity with said adsorbent and a gas component C having high affinity with said adsorbent to said adsorption columns in turn while supplying desorption gas containing a gas component D which is different from said gas components A and C to each of the adsorption columns including the adsorption column to which said raw gas is being supplied;

extracting, when gas including an enriched gas component A is discharged from an outlet of any one of said adsorption columns, all the gas discharged from said adsorption column out of the system;

extracting, when gas including an enriched gas component C is discharged from an outlet of any one of said adsorption columns, all the gas discharged from said adsorption column out of the system;

when gas mixture containing the gas components A and C is discharged from an outlet of any one of said adsorption columns, feeding all the gas discharged from said adsorption column back to the adsorption column to which the raw gas is being supplied; and wherein, (a) when said raw gas is supplied to an inlet of one of said adsorption columns, extracting a fraction including an enriched gas component A or a fraction including an enriched gas component C from the outlet of said adsorption column;

(b) in parallel with the above step (a), supplying said desorption gas to an inlet of at least one of other adsorption columns, extracting gas mixture containing said gas components A and C from the outlet of this adsorption column to further introduce said gas mixture into the adsorption column to which the raw gas is being supplied; and (c) in parallel with the above steps (a) and (b), supplying said desorption gas to an inlet of still another adsorption column, and extracting a fraction including an enriched gas component A or a fraction including an enriched gas component C from the outlet of this adsorption column.

2. A method according to claim 1, wherein the adsorption columns to which said process steps (a), (b), and (c) are taken are shifted one by one in accordance with the movement of accumulation zones of the gas components A and C.

3. A method according to claim 2, wherein said desorption gas is continuously supplied to each of said adsorption columns.

4. A method according to claim 2, further comprising a step of not performing extraction of either the gas component A or C.

5. A method according to claim 1, wherein the pressure within each of said adsorption columns is maintained at the atmospheric pressure or less during operation.

6. A method according to claim 1, wherein extraction of gas from the outlet of each of said adsorption columns is performed using a vacuum pump.

7. A method according to claim 1, wherein a circulation line for feeding the gas from the outlet of each of said adsorption columns back to a raw gas line is not provided with a pump.

8. A gas separation apparatus comprising at least three adsorption columns packed with an adsorbent for obtaining, for separating from raw gas containing a gas component A and a gas component C, gas including an enriched gas component A and gas including an enriched gas component C, comprising:

a raw gas supply line for supplying raw gas to each of said adsorption columns, said raw gas line being connected to raw gas inlet valves provided at corresponding inlets of the respective adsorption columns for controlling supply of the raw gas to each of the adsorption columns;

a desorption gas supply line for supplying desorption gas to each of said adsorption columns, said desorption gas line being connected to desorption gas inlet valves provided at corresponding inlets of the respective adsorption columns for controlling supply of the desorption gas to each of the adsorption columns;

a vacuum pump for A component, connected to A component extraction valves provided at corresponding outlets of respective adsorption columns, for discharging gas including an enriched gas component A extracted from each of said adsorption columns out of the system;

a vacuum pump for C component, connected to C component extraction valves provided at corresponding outlets of respective adsorption columns, for discharging gas including an enriched gas component C extracted from each of said adsorption columns out of the system; and a circulation line, connected to circulation valves provided at corresponding outlets of the respective adsorption columns, for supplying the gas discharged from each of said adsorption columns to said raw gas line, wherein when the gas including enriched gas component A is discharged from the outlet of each of said adsorption columns, all of the gas discharged from the adsorption column is extracted from the system using the vacuum pump for A component;

when the gas including enriched gas component C is discharged from the outlet of each of said adsorption columns, all of the gas discharged from the adsorption column is extracted from the system using the vacuum pump for C component; and when a gas mixture containing the gas components A and C is discharged from the outlet of each of said adsorption columns, all of the gas discharged from the adsorption column is fed back to the raw gas line via the circulation line.

9. An apparatus according to claim 8, wherein said desorption gas is continuously supplied to each of said adsorption columns.

10. An apparatus according to claim 8, wherein the pressure within each of said adsorption columns is maintained at the atmospheric pressure or less during operation.

11. An apparatus according to claim 8, the circulation line for feeding the gas discharged from the outlet of each of said adsorption columns back to the raw gas line is not provided with a pump.

* * * * *